United States Patent
Ahn et al.

(10) Patent No.: US 10,135,191 B1
(45) Date of Patent: Nov. 20, 2018

(54) APPARATUS FOR LOCKING USB PORT

(71) Applicant: COMXI Co., Ltd., Seoul (KR)

(72) Inventors: Chang Hoon Ahn, Gyeonggi-do (KR); Yong Un Choi, Chungcheongnam-do (KR); Byong Ju Bae, Chungcheongnam-do (KR)

(73) Assignee: COMXI Co., Ltd., Seoul (KR)

( * ) Notice: Subject to any disclaimer, the term of this patent is extended or adjusted under 35 U.S.C. 154(b) by 0 days.

(21) Appl. No.: 15/928,959

(22) Filed: Mar. 22, 2018

(30) Foreign Application Priority Data

Jan. 2, 2018 (KR) .................. 10-2018-0000291

(51) Int. Cl.
| | | |
|---|---|---|
| *H01R 13/44* | (2006.01) | |
| *H01R 13/639* | (2006.01) | |
| *H01R 13/443* | (2006.01) | |
| *H01R 107/00* | (2006.01) | |
| *H01R 24/60* | (2011.01) | |

(52) U.S. Cl.
CPC ....... *H01R 13/6397* (2013.01); *H01R 13/443* (2013.01); *H01R 24/60* (2013.01); *H01R 2107/00* (2013.01)

(58) Field of Classification Search
CPC .................................. H01R 13/6397
USPC .................................... 439/133
See application file for complete search history.

(56) References Cited

U.S. PATENT DOCUMENTS

| | | | | |
|---|---|---|---|---|
| 6,991,479 B2* | 1/2006 | Miao | ........................ | G06F 21/85 439/133 |
| 7,462,045 B1* | 12/2008 | Lee | ........................ | H01R 13/443 439/133 |
| 2015/0017824 A1* | 1/2015 | Kung | .................... | H01R 13/443 439/133 |

FOREIGN PATENT DOCUMENTS

| | | |
|---|---|---|
| JP | 6133107 B2 | 5/2017 |
| KR | 10-1412724 B1 | 6/2014 |

* cited by examiner

*Primary Examiner* — Tho D Ta
(74) *Attorney, Agent, or Firm* — Mintz Levin Cohn Ferris Glovsky and Popeo, P.C.; Kongsik Kim; Jhongwoo Jay Peck

(57) ABSTRACT

Disclosed is an apparatus for locking a USB port. The apparatus is configured to be coupled with the USB port including a connection part with recessed grooves, and includes: a main body including first and second mounting portions; a port coupling part coupled with the second mounting portion, and inserted into and coupled with the USB port; a locking part movably provided in the port coupling part and being movable between a lock position where the locking part is coupled with the recessed grooves and a release position where the locking part is separated from the recessed grooves; and a locking and releasing part provided in the first mounting portion to be movable reciprocally, the locking and releasing part controlling locking and releasing motions of the locking part relative to the recessed grooves by interfering with the locking part when the locking and releasing part moves.

8 Claims, 25 Drawing Sheets

I—I

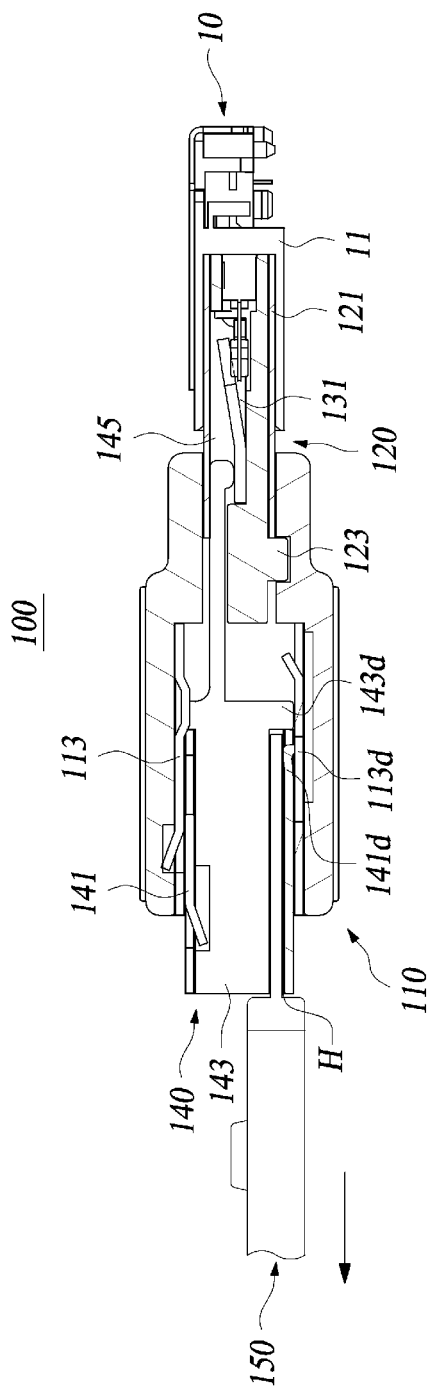

APPARATUS FOR LOCKING USB PORT

CROSS REFERENCE TO RELATED APPLICATION

The present application claims priority to Korean Patent Application No. 10-2018-0000291, filed Jan. 2, 2018, which is incorporated herein by this reference.

TECHNICAL FIELD

The present invention relates generally to an apparatus for locking a USB port. More particularly, the present invention relates to an apparatus for locking a USB port, the apparatus being capable of physically locking and releasing the USB port of a portable electronic device such as a computer, a notebook PC, a tablet PC, a smartphone, etc., thereby preventing data leakage, unauthorized user access, and system penetration.

RELATED ART

With the development of industry and technology, there has been rapid and widespread adoption of personal computers. Most organizations such as companies, government offices, financial institutions, and government agencies, etc. handle affairs using personal computers (including notebook PCs).

In addition, control using computers also takes place in various fields such as machine and process facilities, industrial facilities, and military facilities, etc.

As such, since computer use has become widespread in industry, there has been a great increase in a number of damage cases by malicious codes or viruses, which can infiltrate computers and spread to other computers, causing damage to a system, and leakage of confidential information has been frequently caused thereby.

In consideration of this, various measures have been proposed to prevent the leakage of information in organizations and to protect computers and servers in organizations from infiltration of viruses or the like. As a representative measure, a software security solution has been developed and used to protect computers from malicious codes, virus infiltration, hacking, and the like. However, recently, because the universal use of USB ports due to the development of memory devices has enabled easy access to computers within a very short time, it is often the case that third parties easily access a main computer and thereby install viruses and/or steal confidential information.

In other words, most computers currently on the market and used are equipped with at least one or more universal USB ports. Thus, it is possible for anyone to easily access a desired computer by connecting to the USB port a USB memory device or a USB connection terminal (e.g., a mouse connection terminal, a keyboard connection terminal, a portable device connection terminal, etc.)

Thus, both authorized and unauthorized users may easily connect the USB memory device or the USB connection terminal to a computer to install viruses on the computer, steal confidential information, and/or access the computer for use. Consequently, countermeasures for preventing such security risk are urgently needed.

In response to this need, various types of USB port locking apparatuses have been developed. However, most USB port locking apparatuses in the related art are for locking only a so-called USB 3.0 port corresponding to USB 3.0 standard.

Meanwhile, in recent years, application of a USB 3.1 port corresponding to USB 3.1 standard has been increasing, which features improved data transfer speeds and improved power delivery capabilities as compared with the USB 3.0.

Such a USB 3.1 port is small in size, and the shape and size of a connection terminal of the port is different from that of the 3.0 port. Particularly, a so-called USB 3.1 Type-C port is reversible, so that its use is spreading rapidly to various electronic devices due to its convenience.

However, since the various USB port locking apparatuses in the related art have been developed for the USB 3.0 port, they may not be applied to the USB 3.1 port.

The foregoing is intended merely to aid in the understanding of the background of the present invention, and is not intended to mean that the present invention falls within the purview of the related art that is already known to those skilled in the art.

SUMMARY

Accordingly, the present invention has been made keeping in mind the above problems occurring in the related art, and the present invention provides an apparatus for locking a USB port, the apparatus being capable of physically closing and blocking the USB 3.1 port and physically being coupled with the USB 3.1 port to be prevented from being easily separated therefrom.

In order to achieve the above object, according to one aspect of the present invention, there is provided an apparatus for locking a USB port, the apparatus being configured to be coupled with the USB port that includes a connection part with recessed grooves respectively formed at opposite sides thereof, the apparatus including: a main body including first and second mounting portions; a port coupling part coupled with the second mounting portion of the main body, and inserted into and coupled with the USB port; a locking part movably provided in the port coupling part and being movable between a lock position where the locking part is coupled with the recessed grooves and a release position where the locking part is separated from the recessed grooves; and a locking and releasing part provided in the first mounting portion of the main body to be movable reciprocally such that the locking and releasing part is retractable from a front end of the main body, the locking and releasing part controlling locking and releasing motions of the locking part relative to the recessed grooves by interfering with the locking part when the locking and releasing part moves, wherein the locking and releasing part is partially withdrawn from the main body using a release key in a state of being inserted into the main body, thereby allowing a locking yoke to be released, the release key being coupled with a key hole formed in a front end of the locking and releasing part.

Thus, it is possible to safely block a so-called USB 3.1 port having the connection part with the recessed grooves formed on the opposite sides of the connection part.

Herein, the port coupling part may include: a tubular shaped port coupling housing configured such that an external shape thereof corresponds to an internal shape of the USB port, and opposite ends thereof are open; and a connection member coupled with a rear end of the main body in a state of being inserted into the port coupling housing, wherein the locking part is provided between the connection member and the port coupling housing to be movable between the lock position and the release position.

Thus, it is possible to implement a structure in which the port coupling part having therein the locking part is coupled with the main body, and is inserted into the USB port.

Further, the connection member may include: a plate-shaped connection member body; a guide coupling portion provided at a first end of the connection member body and being in contact with an inner surface of the port coupling housing; first and second protruding coupling portions protruding from opposite sides of a second end of the connection member body, respectively, and coupled with the main body; and a guide portion protruding from an upper surface of the connection member body and guiding movement of the locking and releasing part.

Thus, the connection member is firmly coupled with the main body together with the port coupling housing.

Furthermore, the locking part may include: the locking yoke including a raised web having a plate structure, and a pair of raised arms extending from opposite ends of the raised web to face each other and each having at an end thereof a locking protrusion coupled with each of the recessed grooves, wherein the locking yoke moves reciprocally on the connection member relative to bent portions (P) of boundaries between the raised web and the raised arms in accordance with a movement position of the locking and releasing part, so that the locking protrusions are coupled with or separated from the recessed grooves.

Thus, the locking yoke is interfered with by the locking and releasing part in the port coupling part and thus performs a seesaw motion, thereby being coupled with the recessed grooves to be locked or being separated therefrom to be released.

Further, the connection member may be provided with a support protrusion preventing the raised arms of the locking yoke from being widened outward in a state in which the locking protrusions of the locking yoke are coupled with the recessed grooves of the connection part.

Thus, even when the main body is forcibly pulled in a state of being inserted into the USB port and locked, the raised arms are prevented from being widened outward and released from the recessed grooves, preventing the USB port from being forcibly opened prior to using the release key.

The locking and releasing part may include: an outer frame coupled with the first mounting portion of the main body to be movable reciprocally; a locking member inserted into the outer frame, and including the key hole exposed forward and a pattern groove pattered on an inner surface of the key hole; and an interference bar extending from a rear end of the locking member and connected to the port coupling housing to be reciprocally slidable relative thereto, the interference bar interfering with the locking yoke in accordance with a movement position of the interference bar.

Thus, the locking and releasing part is moved to be partially withdrawn from the main body by using the release key having a pattern that can be coupled to the key hole, thereby releasing a locked state of the locking yoke, thereby enhancing security.

Further, the main body may include: a housing including the first and second mounting portions; and a guide frame provided in the first mounting portion of the housing and coupled with the outer frame such that the outer frame is movable reciprocally, the guide frame being provided with an interference piece interfering with the locking and releasing part moved into the main body to prevent the locking and releasing part from being separated therefrom.

Thus, the locking and releasing part fully inserted into the main body in prevented from being forcibly withdrawn therefrom.

Further, the outer frame may include: an elastic compressing piece protruding to an inside of the outer frame, and moved by being interfered with by a latching bar of the release key inserted into the key hole to allow the interference piece to cooperate with the elastic compressing piece, such that the locking and releasing part is released from a locked state; and an interference protrusion protruding from an outside of the outer frame such that a moving distance of the interference protrusion is limited by a guide groove formed on an inner surface of the first mounting portion.

Thus, when the latching bar of the release key is coupled to the key hole, the locking and releasing part is released from the locked state to the main body and thus is withdrawn therefrom, whereby the locking yoke is released.

Further, the USB port may be a USB 3.1 port having the same patterned-connection terminals formed on opposite surfaces of the connection part, respectively.

Thus, it is possible to safely block the USB 3.1 port that is smaller in size than a USB 3.0 port.

According to the apparatus for locking the USB port according to the present invention, the apparatus is coupled with a USB port of an electronic device, thereby physically blocking the USB port.

In particular, the apparatus is smaller in size than the USB 3.0 port, and can be coupled with the connection part by the locking yoke in a state of being inserted into and coupled with the USB 3.1 port having a smooth outer casing. In this case, the locking and releasing part for releasing the locked state is not allowed to be withdrawn from the main body before an allowed release key is inserted into the key hole.

Thus, the 3.1 USB port can be securely locked, thereby ensuring security.

BRIEF DESCRIPTION OF THE DRAWINGS

The above and other objects, features and other advantages of the present invention will be more clearly understood from the following detailed description when taken in conjunction with the accompanying drawings, in which:

FIG. 25 is a sectional view showing the state of FIG. 24.

DETAILED DESCRIPTION

Figure 1:
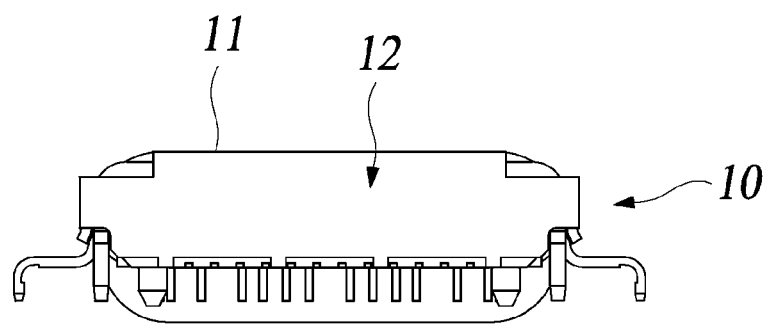
FIG. 1 is a schematic cross-sectional view showing a 3.1 USB port.

Hereinbelow, exemplary embodiments of an apparatus for locking a USB port according to the present invention will be described in detail with reference to the accompanying drawings. Throughout the drawings, the same reference numerals will refer to the same or like parts.

Referring to FIGS. 1 to 25, an apparatus 100 for locking a USB port according to an embodiment of the present invention is configured to selectively lock or release a so-called USB 3.1 port 10.

Figure 2:
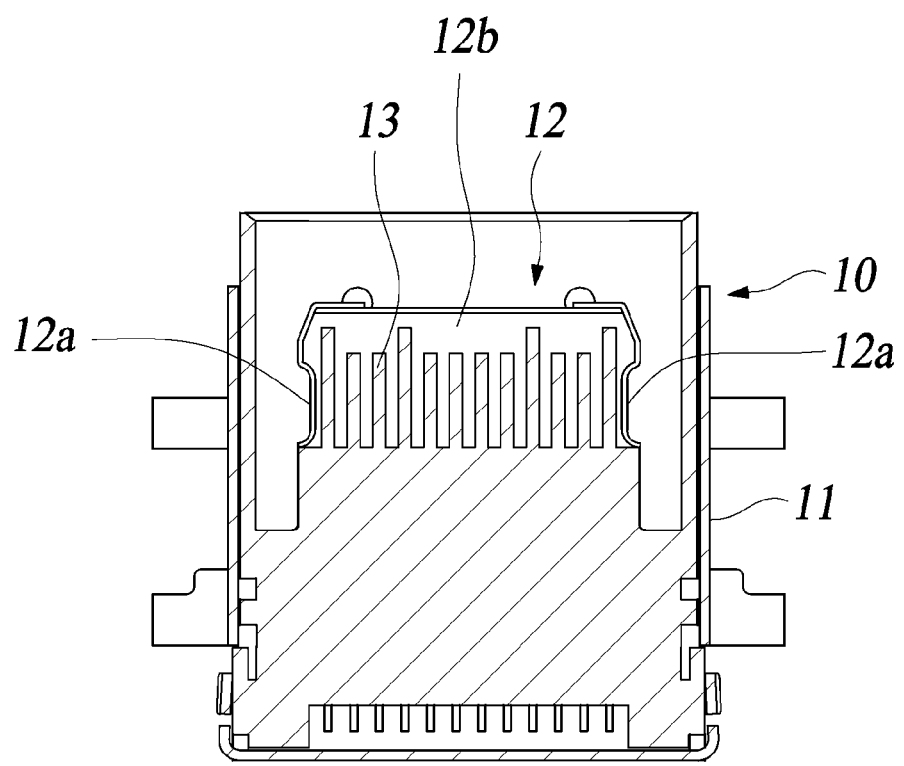
FIG. 2 is a schematic sectional view showing the 3.1 USB port.

As shown in FIGS. 1 and 2, the USB 3.1 port 10 is configured such that a size thereof is smaller than that of a USB 3.0 port, and a connection part 12 thereof is located at an inside center of a port outer frame 11. In particular, a so-called USB 3.1 Type-C port (hereinafter referred to as a USB port) is characterized in that it has a reversible structure in which both ends of a USB connector plug into the USB port in either direction. The connection part 12 includes a connection part body 12b having a thin plate structure and a plurality of terminals 13 patterned on both sides of the connection part body 12b. Herein, a recessed groove 12a is formed on each of opposite sides of the connection part body 12b. The USB 3.1 port 10 with such a structure has an international standard size and shape.

The apparatus 100 for locking the USB port according to the embodiment of the present invention includes a main body 110, a port coupling part 120 connected to the main body 110 and inserted into the USB port 10, a locking part 130 provided in the port coupling part 120 and configured to be lockable and separable to and from the connection part 12 of the USB port 10, a locking and releasing part 140 provided in the main body 110 to be movable reciprocally and controlling the locking part 130, and a release key 150 (see FIG. 22) configured to withdraw the locking and releasing part 140 from the main body 110 such that the locking and releasing part 140 is released from a locked state.

The main body 110 includes a housing 111 and a guide frame 113 installed inside the housing 111. The housing 111 has first and second housings 111a and 111b that are combined to face each other. The first and second housings 111a and 111b are provided with, respectively, at least one hook 112a and at least one hook holding portion 112b provided at positions corresponding to each other and hooked to each other. The housing 111 may be made of a molding material made of synthetic resin.

Figure 3:
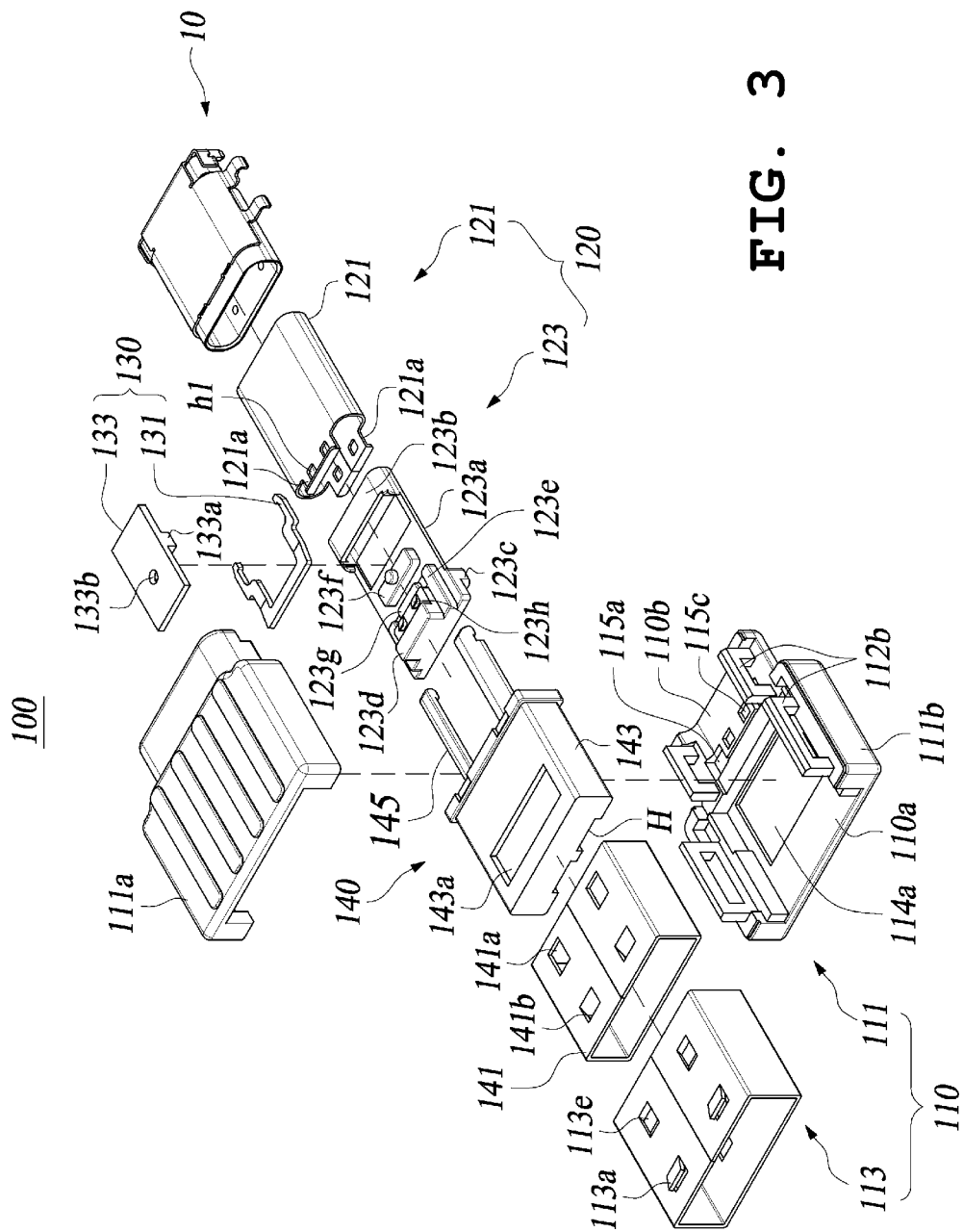
FIGS. 3 and 4 are exploded perspective views showing an apparatus for locking a USB port according to an embodiment of the present invention.

The guide frame 113 is inserted into the housing 111 and fixed thereto. The guide frame 113 has a rectangular frame shape having opposite ends open. The guide frame 113 is made a metal material. The guide frame 113 is integrally provided with a fixing key 113a protruding outwardly to be coupled with a fixing groove 111c formed on an inner surface of the housing 111. Further, the guide frame 113 is provided with an interference piece 113d protruding inwardly to block the locking and releasing part 140 from moving in a releasing direction (a direction in which the locking and releasing part 140 moves to be partially withdrawn from the housing as shown in FIG. 3).

Figure 7:
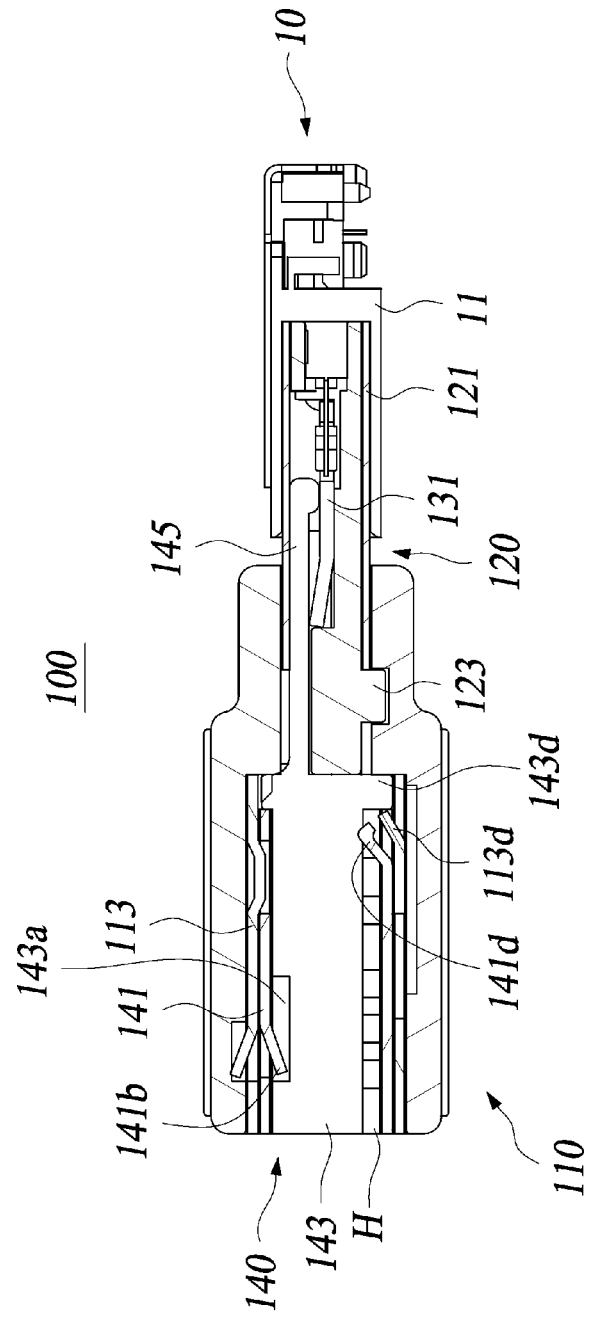
FIG. 7 is a sectional view taken along line II-II of FIG. 5.

In addition, the guide frame 113 is provided with interference protrusions 113e protruding toward the locking and releasing part 140. The interference protrusion 113e are formed positions corresponding to interference holes 141a formed in an outer frame 141 of the locking and releasing part 140. The interference protrusions 113e provide a frictional force to the locking and releasing part 140 to keep the locking and releasing part 140 in a locked state at a lock position (in a state in which the locking and releasing part 140 fully moves into the housing as shown in FIG. 7), thereby preventing the locking and releasing part 140 from moving freely.

Herein, the guide frame 113 is coupled with a first mounting portion 110a provided at a front side of the housing 111. A second mounting part 110b provided at a rear side of the first mounting part 110a is coupled with the port coupling part 120. The first mounting portion 110a is provided with a guide recess 114a recessed on an inner surface thereof. An interference protrusion 141c of the locking and releasing part 140 is received in the guide recess 114a. The interference protrusion 141c is limited to be movable by a distance that corresponds to a length of the guide recess 114a whereby a moving distance of the locking and releasing part 140, that is, a distance that the locking and releasing part 140 moves to be partially withdrawn from the main body 110 is determined. Thus, the locking and releasing part 140 is prevented from being separated from the main body 110.

The second mounting portion 110b is provided with first and second coupling recesses 115a and 115b and a hook recess 115c that are configured to fix the port coupling part 120. The first coupling recesses 115a are coupled with first protruding coupling portions 123c protruding from a lower surface of the connection member 123. The second coupling recess 115b is coupled with a second protruding coupling portion 123d protruding from an upper surface of the connection member 123. The hook recess 115c is coupled with at least one hook 123h formed on the connection member 123. A plurality of the hook recesses 115c are formed on each of the first and second housings 111a and 111b.

The port coupling part 120 includes a port coupling housing 121 inserted into the USB port 10, and the connection member 123 installed inside the port coupling housing 121 and supporting the locking yoke 131, the connection member 123 being coupled with the housing 111.

The port coupling housing 121 has a structure in which opposite ends thereof are open, and an external shape thereof is formed correspondingly to the port outer frame 11 of the USB port 10. Accordingly, the port coupling housing 121 is inserted and coupled to the USB port 10 from a first end thereof. The port coupling housing 121 is provided with a pair of coupling portions 121a for coupling with the connecting member 123, the coupling portions 121a being formed at a second end of the port coupling housing 121 while facing each other. In other words, the coupling portions 121a extends from upper and lower edges of the second end of the port coupling housing 121, respectively, and each of the coupling portions 121a is provided with at least one coupling hole h1. The coupling hole h1 is coupled with the hook 123h formed on the connection member 123.

The connection member 123 includes a connection member body 123a and a guide coupling portion 123b provided at a first end of the connection member body 123a and being in contact with an inner surface of the port coupling housing 121, the first and second protruding coupling portions 123c and 123d protruding from opposite sides a second end, respectively, of the connection member body 123a, a guide portion 123e protruding from the connection member body 123a, and a locking yoke support protrusion 123f. The connection member body 123a having a plate structure is configured such that the first end thereof is inserted into the port coupling housing 121 and the second end portion is coupled to the second mounting portion 110b of the housing 111 in a state of being coupled with the port coupling housing 121.

The guide coupling portion 123b integrally protrudes from the first end of the connection member body 123a. The guide coupling portion 123b has an external shape corresponding to the inner surface of the port coupling housing 121, that is, a substantially elliptical tubular shape. Thus, the guide coupling portion 123b is inserted into the port coupling housing 121 in tight contact therewith, whereby the connection member 123 and the port coupling housing 121 can be coupled with each other in a stable position without moving.

The first protruding coupling portions 123c protrude from a first side of the second end of the connection member body 123a and are coupled with the first coupling recesses 115a formed on the second mounting portion 110b. The second protruding coupling portion 123d protrudes from a second side of the second end of the connection member body 123a. The second protruding coupling portion 123d is inserted into the second coupling recess 115b formed on the second mounting portion 110b.

The guide portion 123e protrudes from the upper surface of the connection member body 123a and guides a reciprocating movement of the locking and releasing part 140. Preferably, the guide portion 123e is formed on each of opposite sides of the connection member body 123a such that the guide portions 123e are symmetrically arranged with respect to each other.

The locking yoke support protrusion 123f protrudes from the upper surface of the connection member body 123a and is distanced from a protruding step 123g on which the hook 123h is formed. The locking yoke 131 is interposed between the locking yoke supporting protrusion 123f and the protruding step 123g such that the locking yoke 131 is limited to move in the forward and backward directions while being guided to move in the upward and downward directions.

Further, the hooks 123h are formed on each of the upper surface and the lower surface of the connection member body 123a. The hooks 123h are coupled simultaneously with the coupling holes h1 of the port coupling housing 121 and with the hook recesses 115c of the second mounting portion 110b. In other words, the hooks 123h are coupled with the first coupling holes 115a formed in the housing 111 through the coupling holes h1 formed in each of the coupling portions 121a. Thus, the port coupling portion 120 and the main body 110 can be more firmly coupled with each other.

Figure 11:
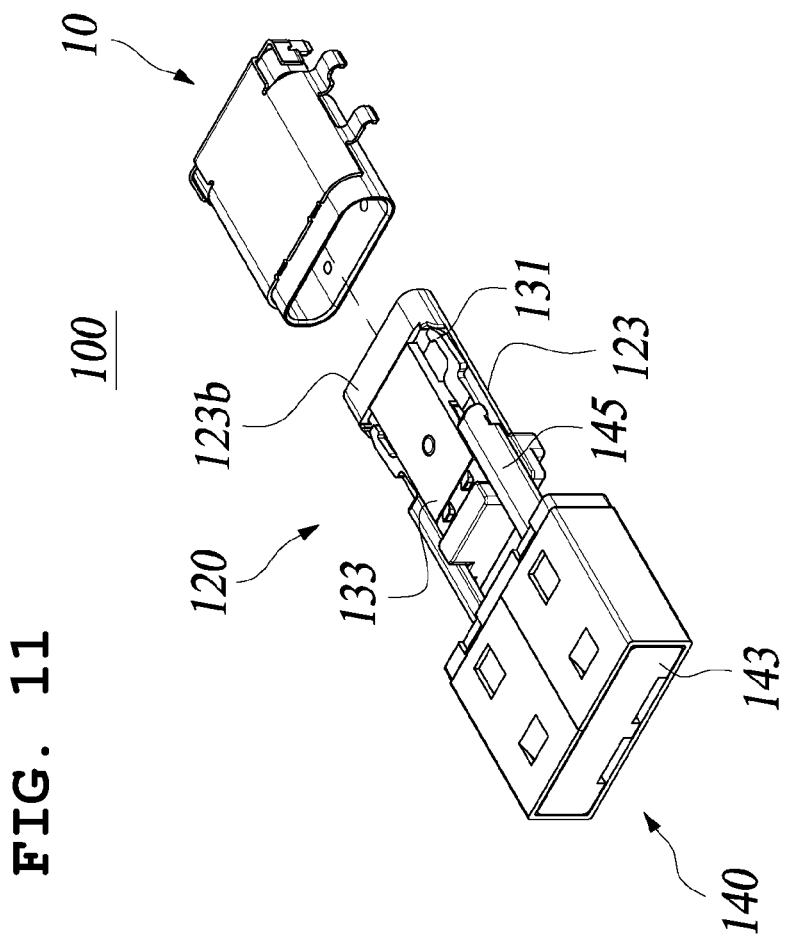
FIG. 11 is a partially coupled perspective view showing a state in which the apparatus for locking the USB port according to the present invention is in a released state.
Figure 12:
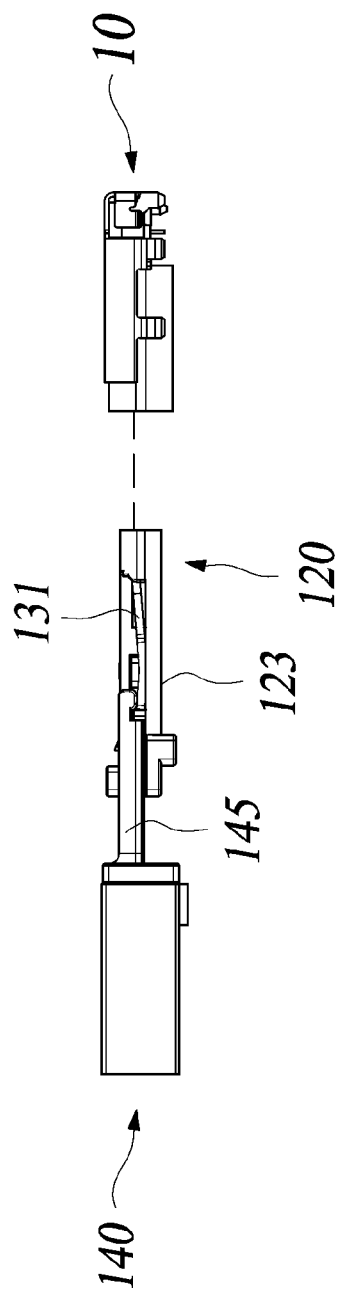
FIG. 12 is a side view showing the state of FIG. 11.
Figure 13:
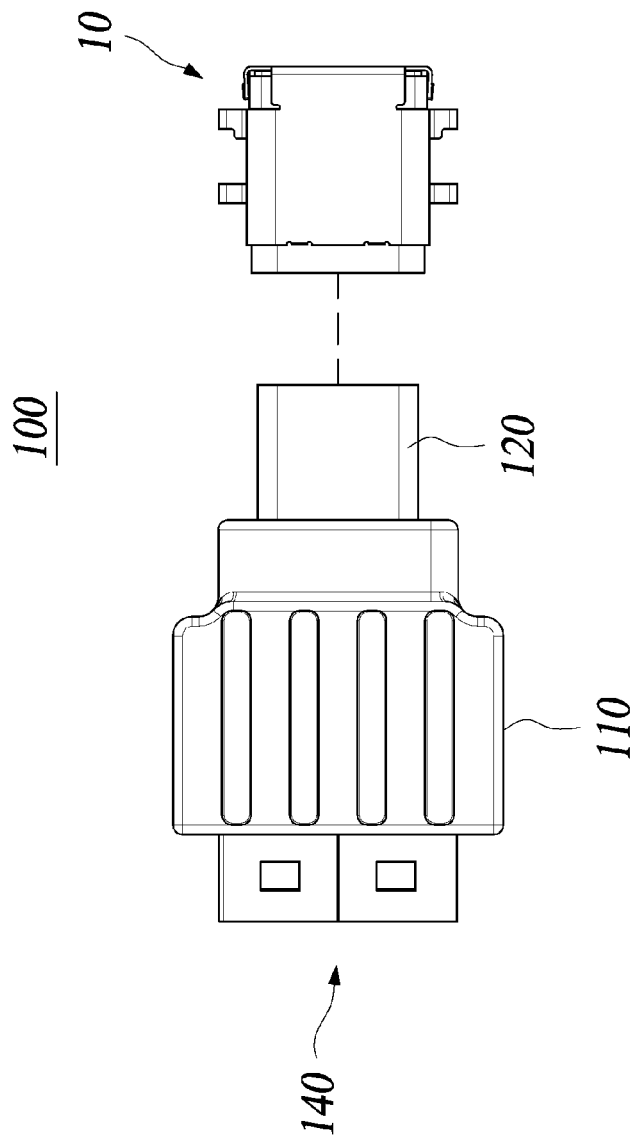
FIG. 13 is a plan view showing a state before the apparatus for locking the USB port in the released state is coupled to the USB port.

As shown in FIG. 11, when assembling the port coupling part 120 having the above described configuration, an interference bar 145 of the locking and releasing part 140 is assembled together with the port coupling housing 121 and the connection member 123 in a state of being seated on the guide portion 123e. Thus, the locking and releasing part 140 can be connected with the port coupling part 120 to be movable reciprocally with respect thereto.

Figure 8:
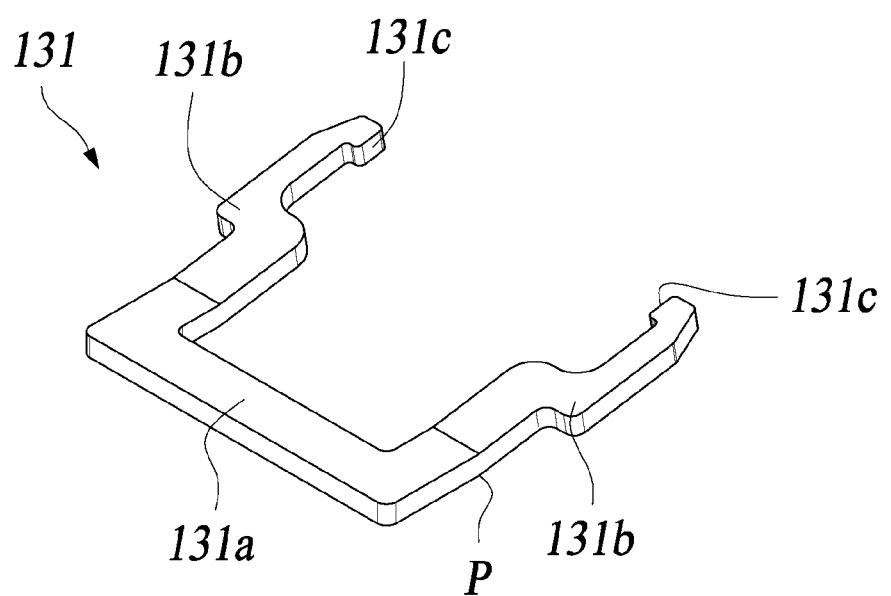
FIG. 8 is a perspective view showing a locking yoke shown in FIG. 3.
Figure 9:
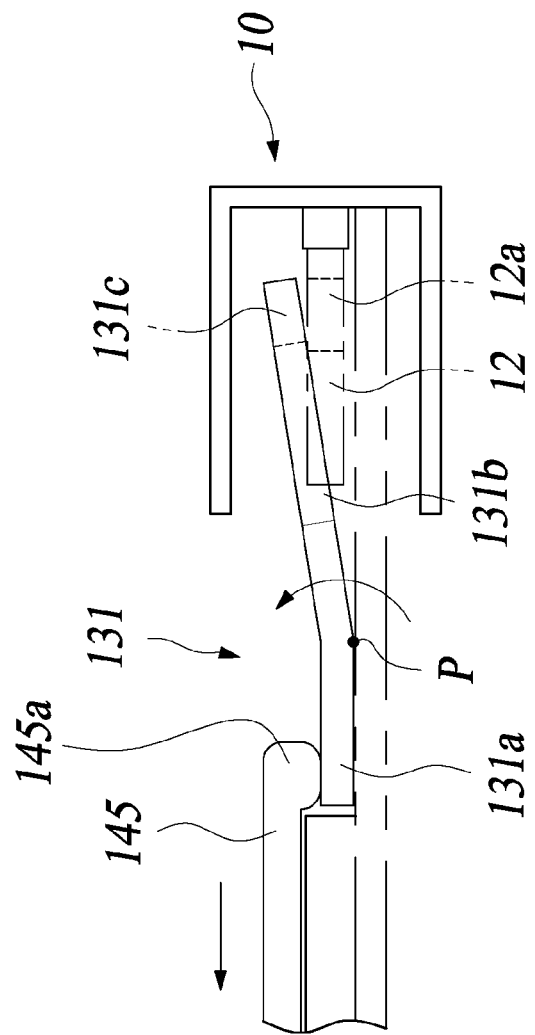
FIG. 9 is a schematic side view showing a state in which the locking yoke is released from the USB port.
Figure 10:
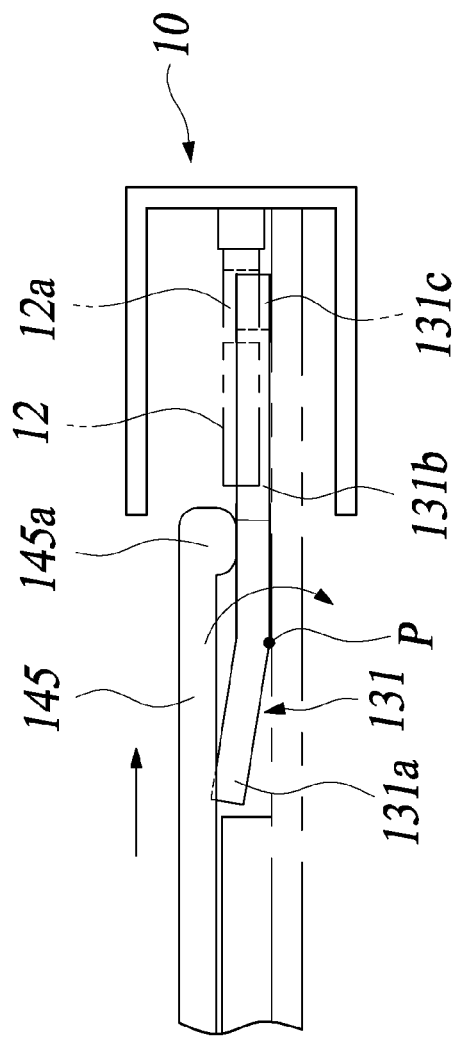
FIG. 10 is a schematic side view showing a state in which the locking yoke is locked to the USB port.

The locking part 130 includes the locking yoke 131 and a locking yoke holding member 133. The locking yoke 131 is installed in the port coupling part 120, and is locked into the recessed grooves 12a formed on the connection part 12 of the USB port 10 and is separated therefrom. Referring to FIGS. 8 to 10, the locking yoke 131 is divided into a raised web 131a and a pair of raised arms 131b with respect to respective bent portions P. The raised web 131a has a plate structure, and the raised arms 131b extend to face each other from opposite ends of the raised web 131a. The raised web 131a and each of the raised arms 131b extend at an obtuse angle with each other relative to the bent portion P. Thus, the raised web 131a and the raised arms 131b perform a seesaw operation around the bent portions P. Herein, the raised arms 131b extend from the bent portions P whereby the raised arms 131b are coupled to the recessed grooves 12a of the connection part 12 of the USB port (see FIG. 10) or separated therefrom (see FIG. 9) in accordance with a movement position thereof. To this end, each of the raised arms 131b is provided at an end thereof with a locking protrusion 131c formed corresponding to the recessed groove 12a. The locking yoke 131 having the above configuration is configured such that the raised web 131a and the raised arms 131b are interfered with by the interference bar 145 of the locking and releasing part 140 and thereby change movement positions thereof. Thus, as the movement positions of the raised web 131a and the raised arms 131b are changed, the locking protrusions 131c are inserted into or separated from the recessed grooves 12a as shown in FIGS. 9 and 10. In other words, when the raised web 131a is interfered with by and pressed downward by an interference protrusion 145a of the interference bar 145, which will be described later, the raised arms 131b is moved upward in the opposite direction thereto (upward direction in the drawing) relative to the bent portion P. Then, the locking protrusions 131c are separated from the recessed grooves 12a and thus are in a released state. In this state, the port coupling part 120 can be separated from the USB port 10.

Conversely, as shown in FIG. 10, when the raised arms 131b are interfered with by and pressed downward by the interference protrusion 145a of the interference bar 145 moved forward, the locking protrusions 131c are inserted into the recessed grooves 12a and thus are in a locked state. Thus, the port coupling part 120 is not separated from the USB port 10 in such a state. In this locked state, the port coupling part 120 can be maintained in the inserted state into the USB port 10 without being separated therefrom.

Figure 15:
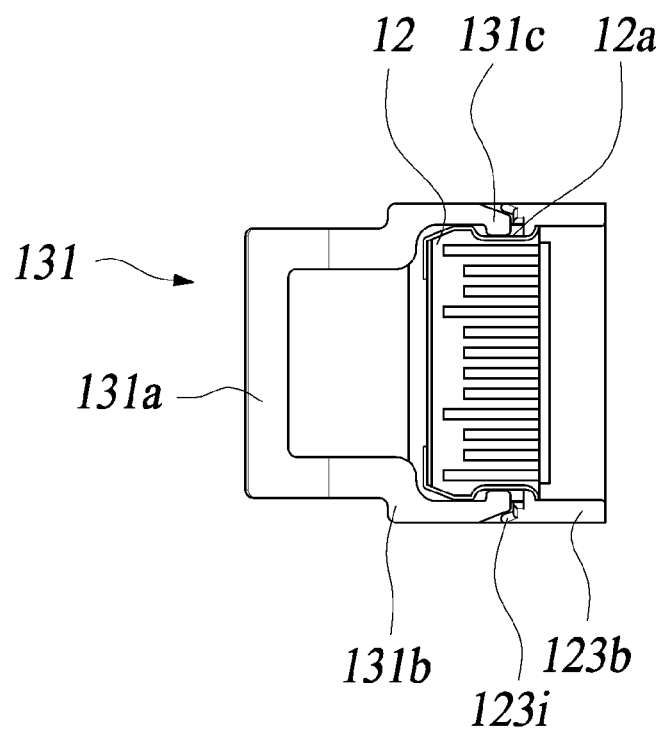
FIG. 15 is a schematic plan view showing a state in which the locking yoke is coupled to the USB port.

Herein, as shown in FIG. 15, the guide coupling portion 123b of the connection member 123 may be provided with support protrusions 123i protruding corresponding to outsides of the locking protrusions 131c of the locking yoke 131, such that the locking yoke 131 is prevented from being widened outward by an external force exerting thereon in a state of being locked to the recessed grooves 12a. Thus, even when the main body 110 is forcibly pulled in the locked state, the ends of the pair of the raised arms 132b are prevented from being widened outward, whereby the locking protrusions 131c are prevented from being separated from the recessed grooves 12a. As a result, the USB port 10 can be safely blocked.

Further, in the present invention, the raised web 131a and the raised arms 131b of the locking yoke 131 extend in a plate shape having a flat angle relative to the respective bent portion P, but this is merely an example. In other words, the locking yoke 131 may have a shape rounded at the bent portions P, and the raised web 131a and the raised arms 131b may have a rounded shape having a predetermined curvature.

Figure 6:
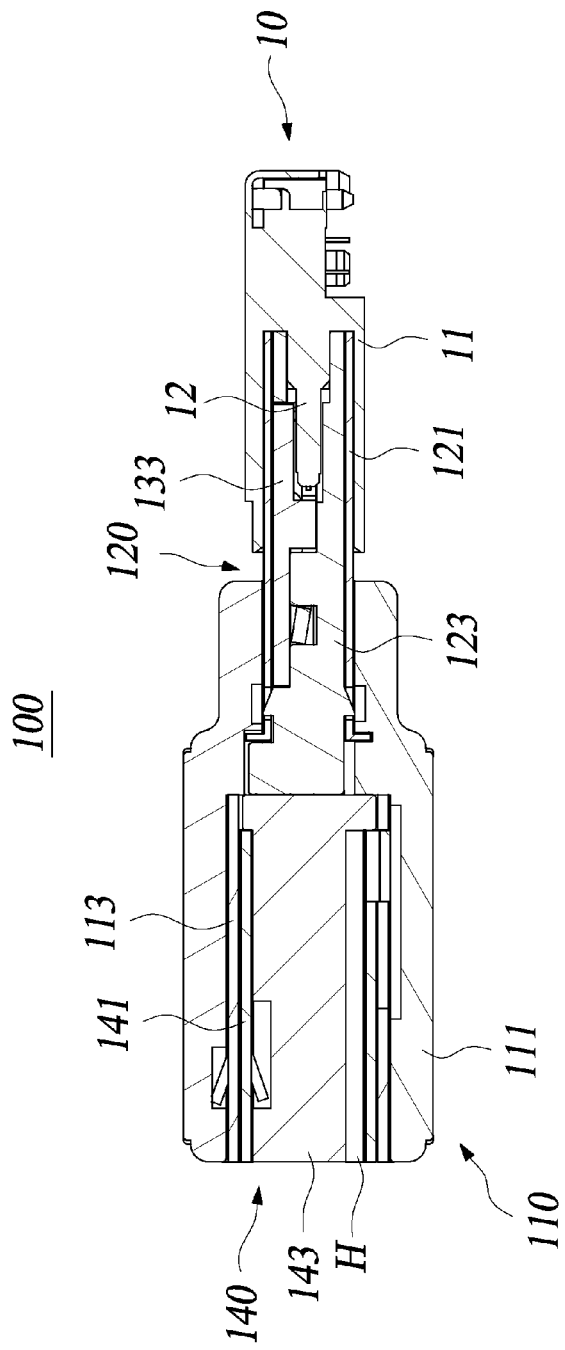
FIG. 6 is a sectional view taken along line I-I of FIG. 5.

The locking yoke holding member 133 is coupled with the first surface of the connection member 123 so as to cover the locking yoke 131. In other words, the locking yoke holding member 133 has a plate structure and is provided with a holding step 133a protruding from a surface of the locking yoke holding member 133, the surface facing the connection member 123. The holding step 133a is supported in close contact with the first surface of the connection member 123. The locking yoke holding member 133 may be provided with a coupling hole 133b such that the coupling hole 133b is coupled with a coupling pin formed on the locking yoke support protrusion 123f. The locking yoke holding member 133 allows the locking yoke 131 to move reciprocally in a stable position and limits moving distances of the locking protrusions 131c of the locking yoke 131. To this end, as shown in FIG. 6, the locking yoke holding member 133 is arranged to face the connection member 123 with the connection part 12 of the USB port 10 interposed therebetween. Thus, when the port coupling part 120 is inserted into the USB port 10, the connection part 12 is positioned between the connection member 123 and the locking yoke holding member 133.

The locking and releasing part 140 is configured to control the locking yoke 131 such that the locking yoke 131 changes a position thereof between a lock position (see FIG. 10) where the locking yoke 131 is locked to the recessed grooves 12a, and a release position (see FIG. 9) where the locking yoke 131 is separated from the recessed grooves 12a. The locking and releasing part 140 includes the outer frame 141 and the locking member 143 having at least one key hole H, and the interference bar 145 connected to a rear side of the locking member 143.

Figure 23:
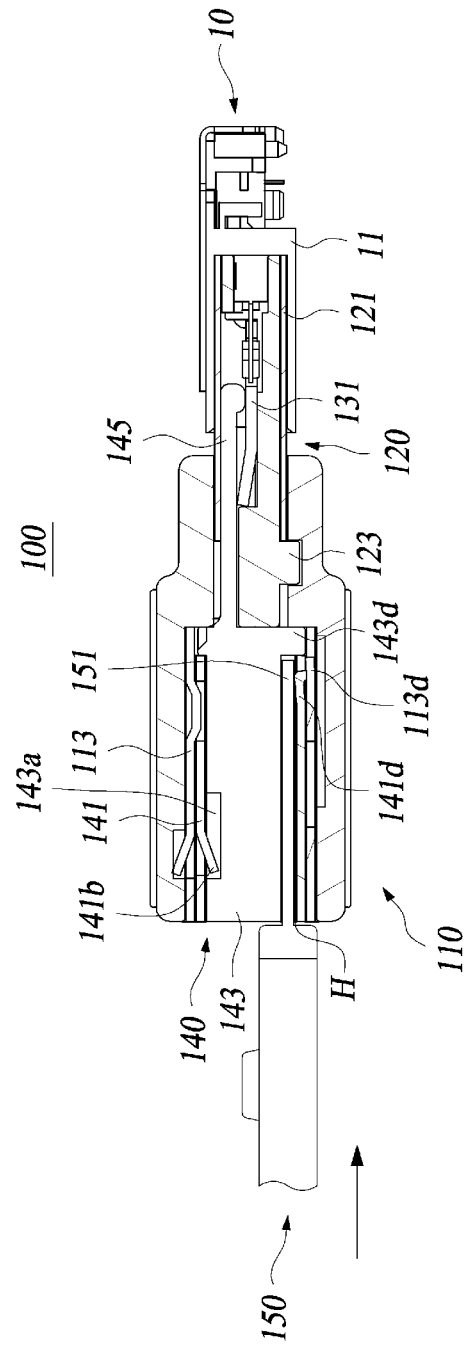
FIG. 23 is a sectional view showing the state of FIG. 22.
Figure 24:
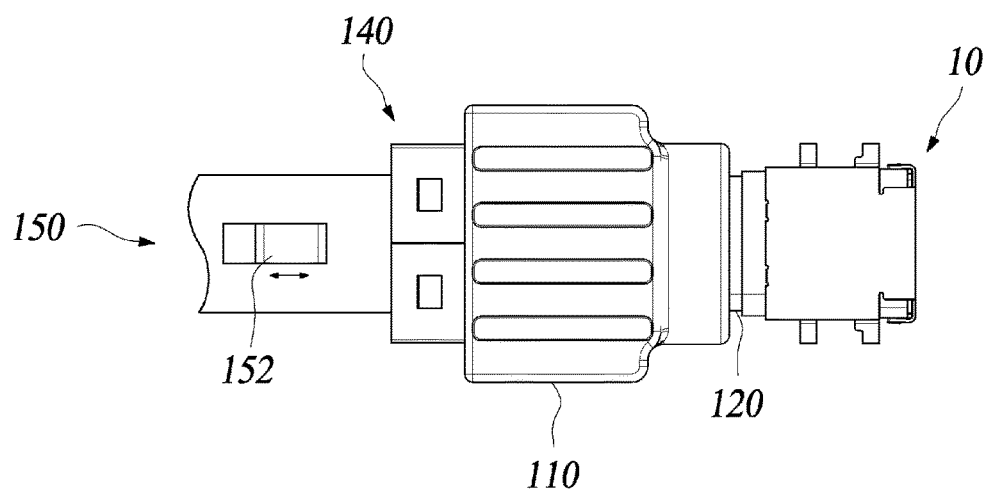
FIG. 24 is a plan view showing a state in which the release key is pulled such that a locking and releasing part is withdrawn to a release position in the state of FIG. 23.

The outer frame 141 has a frame shape corresponding to the guide frame 113. The outer frame 141 has a structure in which an upper wall, a lower wall, and a pair of facing side walls are connected to each other in a substantially rectangular frame shape. A plurality of the interference holes 141a are formed in the upper wall of the outer frame 141, and the interference protrusion 113e of the guide frame 113 is locked into the interference hole 141a and thus a friction force is generated. In addition, a plurality of locking pieces 141b protrude inwardly from the upper wall to be locked to a locking groove 143a formed on an outer surface of the locking member 143. Thus, the locking member 143 is inserted into the outer frame 141 and can be maintained in a coupled state without being separated therefrom. Moreover, an elastic compressing piece 141d protrudes inwardly from the lower wall of the outer frame 141 toward the locking member 143. The elastic compressing piece 141d is formed at a position corresponding to the interference piece 113d of the guide frame 113 (see FIG. 7). The elastic compressing piece 141d is deformed by a latching bar 151 inserted into the key hole H (see FIG. 23), and pushes the interference piece 113d outward of the guide frame 113. Thus, the interference piece 113d blocking a stop step 143d of the locking member 143 is released from the stop step 143d. Thus, in a state in which the latching bar 151 of the release key 150 is inserted into the key hole H (see FIG. 23), a locked state of the locking member 143 due to the interference piece 113d is released. Accordingly, as shown in FIGS. 24 and 25, the locking and releasing part 140 can be partially withdrawn from the main body 110.

The locking member 143 is a structure that is accommodated in the outer frame 141, and may be a mold material made of synthetic resin. The locking groove 143a is formed on a first surface (upper surface in the drawing) of the locking member 143 such that the locking groove 143a is coupled with the locking piece 141b of the outer frame 141. The key hole H is formed on a second surface (lower surface in the drawing) of the locking member 143 by being open and recessed on a front surface of the locking member 143. In other words, the key hole H is recessed on the front surface and the lower surface of the locking member 143 at a predetermined depth. In addition, the key hole H is provided on an inside surface thereof with a pattern groove 143c corresponding to a key pattern 151a of the latching bar 151. Furthermore, the stop step 143d extending outwardly from a rear end of the locking member 143 such that the interference piece 113d of the guide frame 113 is stopped by the stop step 143d (see FIG. 7). The locking member 143 having the above configuration is coupled with the outer frame 141 such that the locking member 143 can move reciprocally in the guide frame 113 by a predetermined distance in a coupled state with the outer frame 141. Thus, the locking member 143 can move to be partially withdrawn from the main body 110 (see FIGS. 3 and 24) and to retract into the main body 110 (see FIGS. 7 and 19).

The interference bar 145 may extend integrally from the rear end of the locking member 143 by a predetermined length, and a pair of the interference bars 145 is arranged parallel to each other. Each of the interference bars 145 is provided at the end thereof with the interference protrusion 145a. A guide wall 145b guided by the guide portion 123e of the connection member 123 is provided between the interference protrusion 145a and the locking member 143. The interference bars 145 move forward (locking direction) or move backward (release direction) along the guide portions 123e in accordance with a position (release position) where the locking and releasing part 140 is partially withdrawn from the main body 110 or a position (lock position) where the locking and releasing part 140 retracts into the main body 110. Thus, in a lock position, the interference protrusions 145a interfere with the raised arms 131b to allow the raised arms 131b to move downward whereby the locking protrusions 131c are coupled to the recessed grooves 12a, as shown in FIG. 10. In a release position, the interference protrusions 145a interfere with the raised web 131a of the locking yoke 131 whereby the locking protrusions 131c are separated from the recessed grooves 12a as shown in FIG. 9. Thus, in this released state, the port coupling part 120 can be inserted into the USB port 10, or can be withdrawn therefrom in the inserted state.

Figure 4:
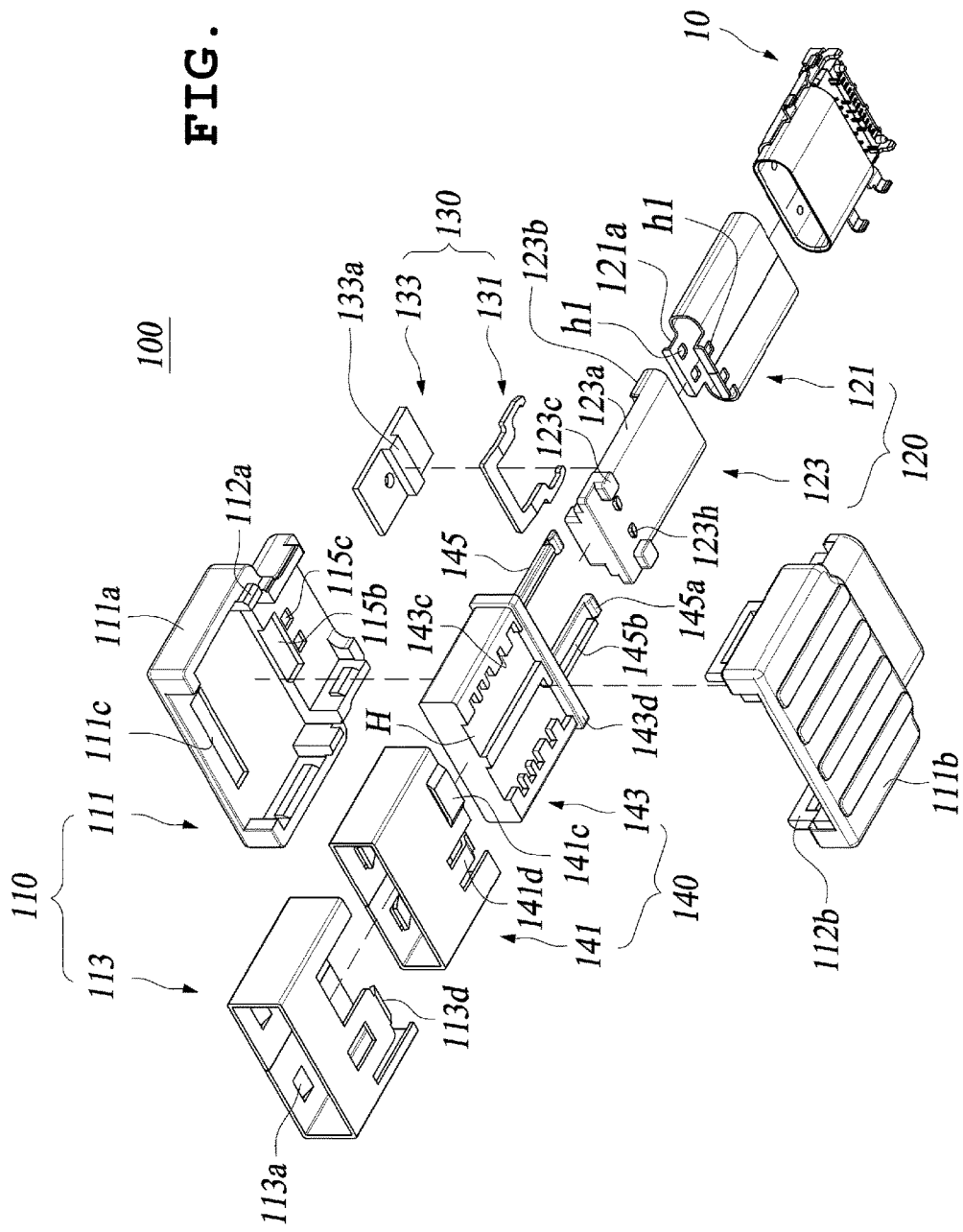
Figure 5:
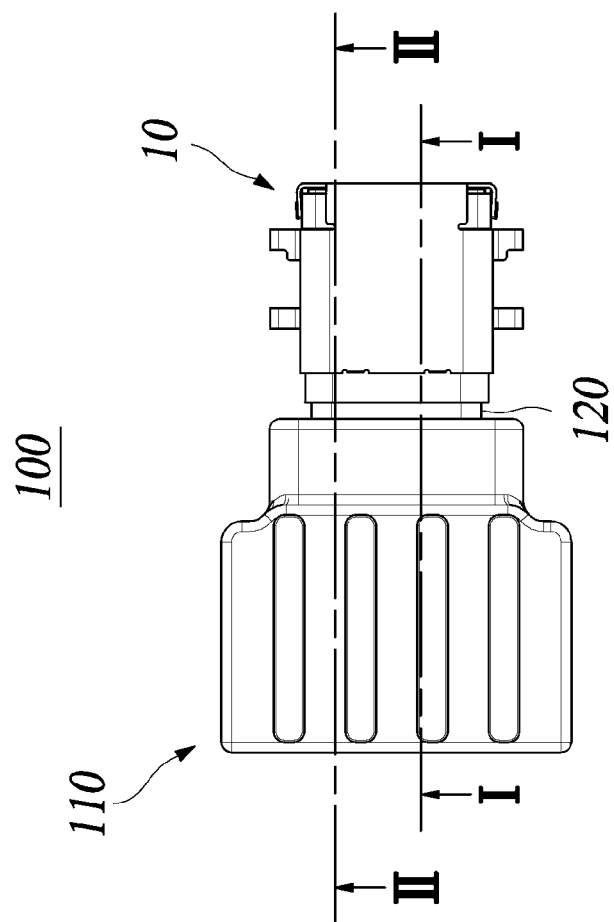
FIG. 5 is a plan view showing a state in which the apparatus for locking the USB port according to the embodiment of the present invention is coupled to the USB port.

The release key 150 has a pair of the latching bars 151 each corresponding to the pattern groove 143c patterned on an inner surface of the key hole H (see FIG. 4). A gap defined between the pair of the latching bars 151 is adjusted by operation of an operation knob 152. The latching bars 151 are inserted into the key holes H in a state in which the gap defined therebetween is decreased, and then the operation knob 152 is operated to widen the latching bars 151 as shown in FIGS. 23 and 24. Thereafter, the key patterns 151a of the latching bars 151 are coupled to the pattern grooves 143c formed on the inner surface of the key holes H. Here, the key patterns 151a and the pattern grooves 143c may be formed in various patterns to enhance security. Further, as shown in FIG. 23, when the latching bars 151 enter the key holes H, the latching bars 151 interfere with the elastic compressing piece 141d of the outer frame 141 and push it outward. The elastic compressing piece 141d pushed outward pushes outward the interference piece 113d of the guide frame 113 whereby the stop step 143d is released from the interference piece 113d. When the release key 150 is pulled in this state, as shown in FIG. 24, the locking and releasing part 140 is pulled by the release key 150 and then is partially withdrawn from the main body 110 by a predetermined length, thereby being moved to a release position. The configurations of the release key 150 and the key hole H, that is, the structures of the latching bar 151 and the pattern groove 143c formed on the inner surface of the key hole H may vary, and a detailed configuration and operation of the release key 150 can be easily understood, so a detailed description thereof will be omitted.

According to the apparatus for locking the USB port according to the embodiment of the present invention having the above configuration, the apparatus 100 allows an unused USB port 10 of an electronic device such as a computer, etc. to be blocked such that the USB port 10 is prevented from being used for access to the electronic device by other users, thereby preventing access of a third person through the USB port 10. Specifically, in order to block the USB port 10, as shown in FIGS. 3, 11, 12, and 13, the locking and releasing part 140 is first withdrawn partially from the main body 110 so as to be in a released state. In this state, as shown in FIG. 9, the raised web 131a of the locking yoke 131 is pressed by the interference protrusions 145a of the interference bars 145 and thus is positioned at a release position.

Figure 14:
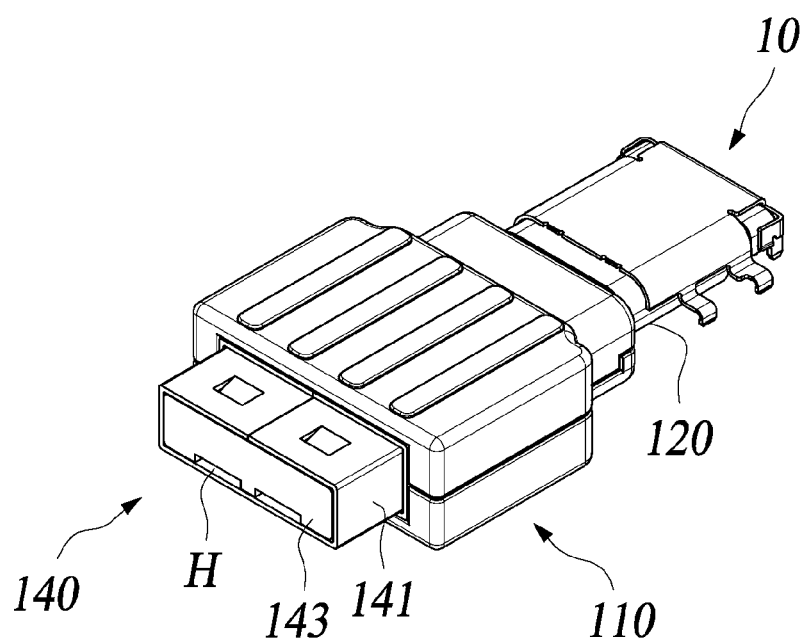
FIG. 14 is a perspective view showing a state in which the apparatus for locking the USB port in the released state is coupled to the USB port.
Figure 16:
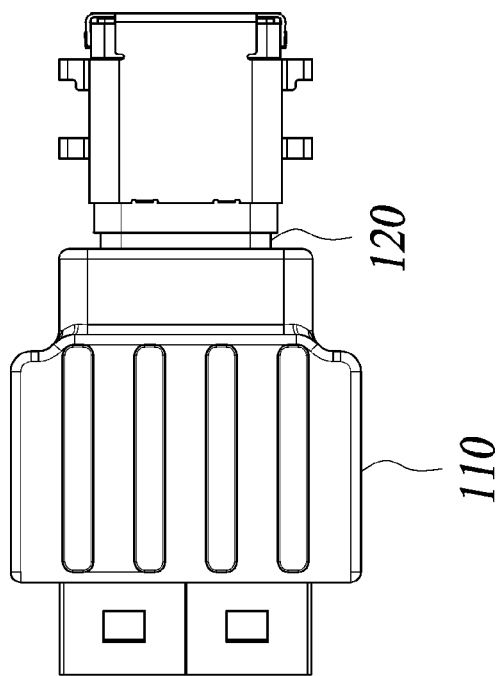
FIG. 16 is a plan view showing the state of FIG. 14.
Figure 17:
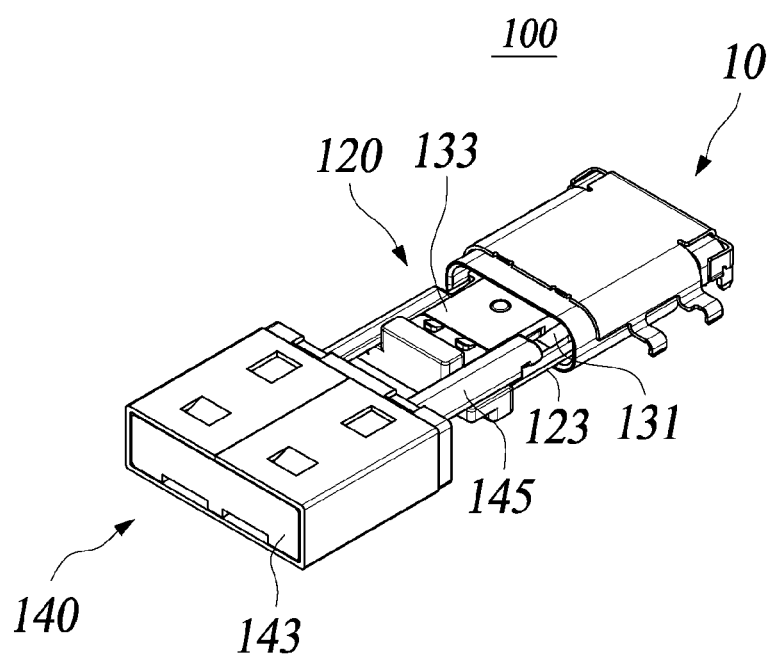
FIG. 17 is a perspective view showing a state in which a port coupling part is inserted into the USB port in the state of FIG. 11.
Figure 18:
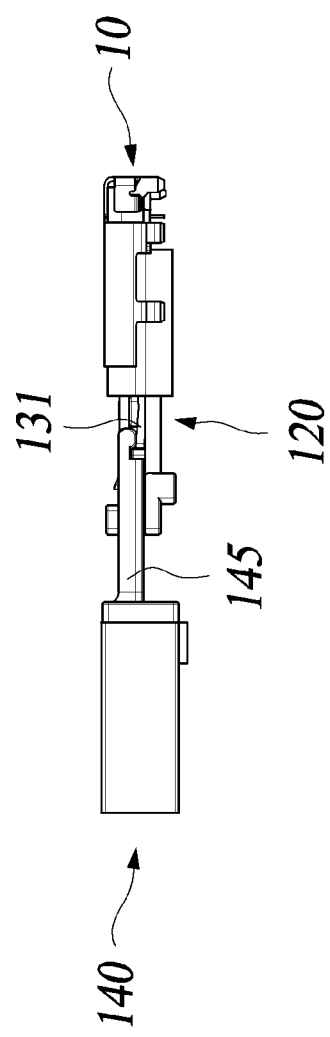
FIG. 18 is a side view showing the state of FIG. 17.
Figure 19:
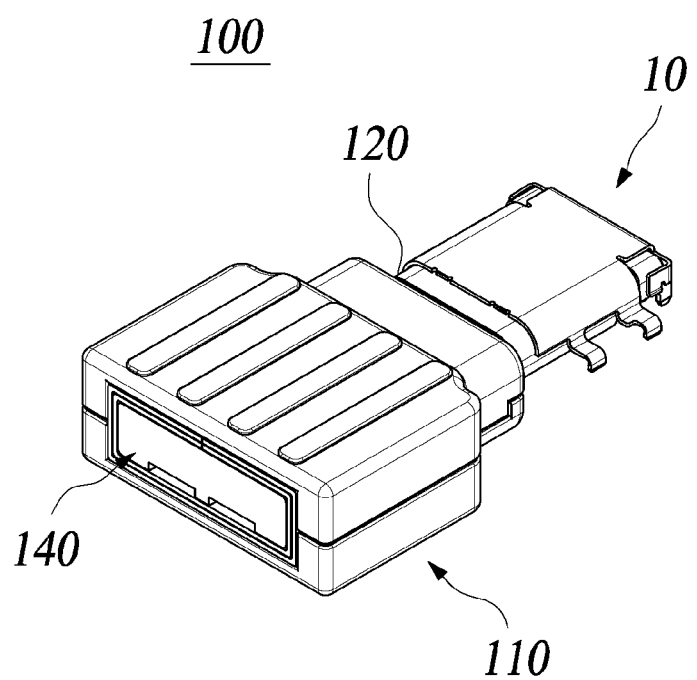
FIG. 19 is a perspective view showing a state in which the port coupling part in a coupled state to the USB port is in a locked state.
Figure 20:
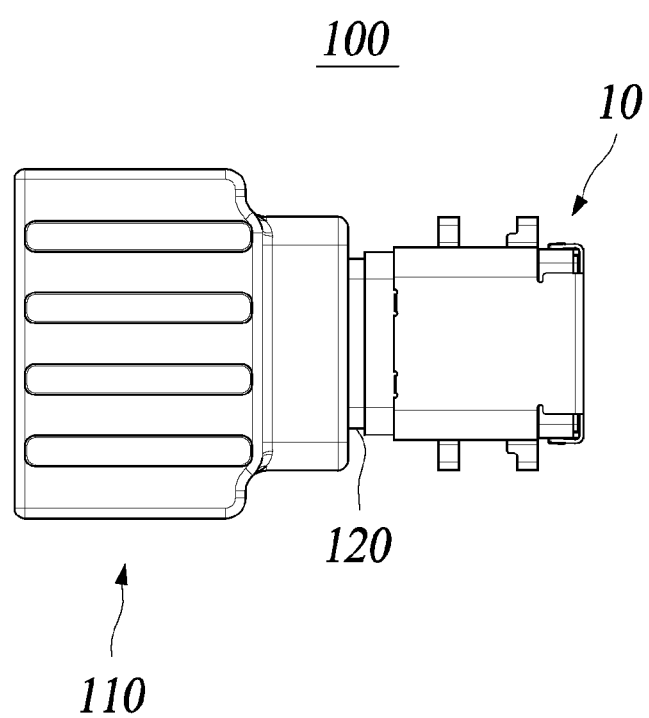
FIG. 20 is a plan view showing the state of FIG. 19.

In this state, as shown in FIGS. 14, 16, and 17, the port coupling part 120 is coupled to the USB port 10 to be blocked.

Then, as shown in FIGS. 6, 7, 19, 20, 21, and 22, the locking and releasing part 140 partially withdrawn from the main body 110 is pushed thereinto.

Then, as described above, the interference protrusions 145b of the interference bars 145 interfere with the raised arms 131b of the locking yoke 131 to allow the raised arms 131b of the locking yoke 131 to be moved to a lock position as shown in FIG. 10. As a result, the locking yoke 131 is inserted into the recessed grooves 12a of the connection part 12 and thus is in a locked state. Thus, in this state, the port coupling part 120 is prevented from being forcibly separated from the USB port 10, whereby and the USB port 10 can be blocked safely.

Figure 21:
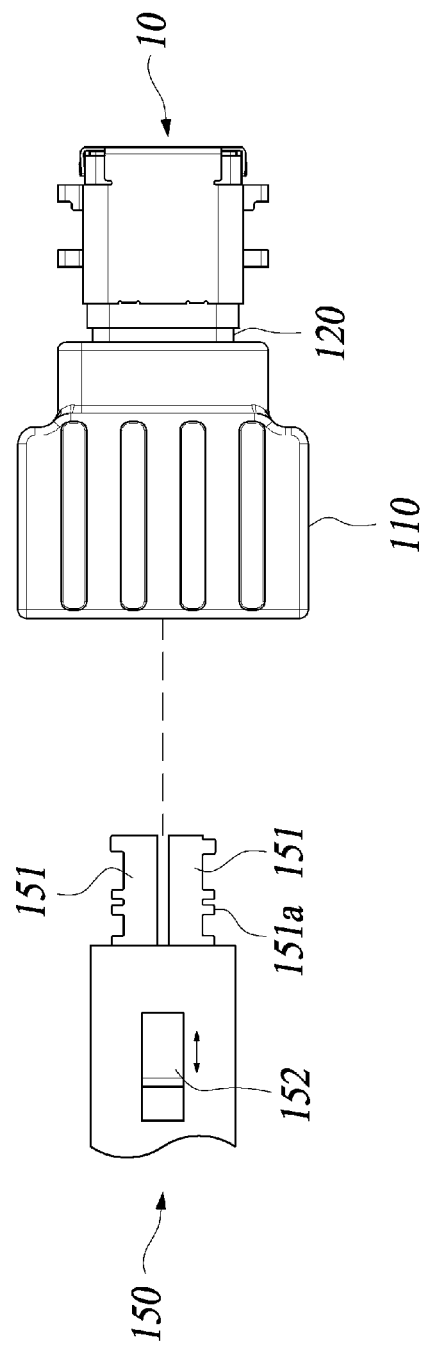
FIG. 21 is a plan view showing a state before a release key is coupled to a key hole in the state of FIG. 19.
Figure 22:
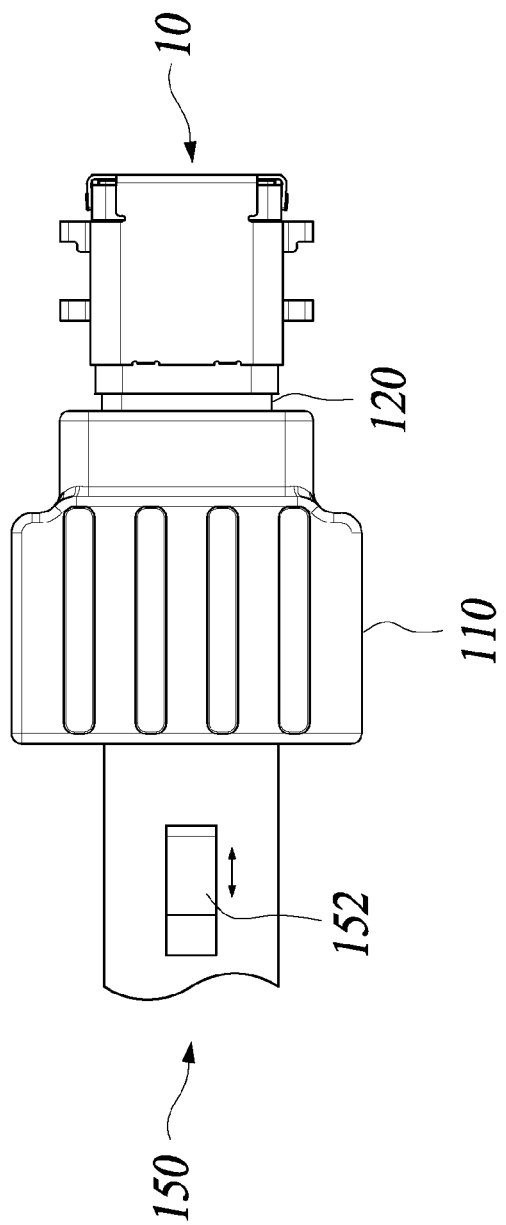
FIG. 22 is a plan view showing a state in which the release key is inserted into the key hole in the state of FIG. 21.

Next, in order to remove the apparatus 100 according to the present invention from the USB port 10, as shown in FIGS. 22 and 23, the latching bars 151 of the release key 150 are inserted into the key holes H in a state of FIG. 21. Then, the interference piece 113d is deformed by the elastic compressing piece 141d pushed by the latching bars 151 inserted into the key holes H, and thus is separated from the stop step 143d. Accordingly, when the release key 150 is pulled in this state, as shown in FIGS. 24 and 25, the locking and releasing part 140 is withdrawn from the main body 110 by the release key 150. Then, as shown in FIG. 9, the interference protrusions 145a of the interference bars 145 interfere with the raised web 131a of the locking yoke 131 to allow the raised web 131a of the locking yoke 131 to move upward. Thus, the locking protrusions 131c of the locking yoke 131 are separated from the recessed grooves 12a of the connection part 12 and thus are released. In this state, when the main body 110 is pulled the port coupling part 120 can be safely separated from the USB port 10.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for locking a USB port, the apparatus being configured to be coupled with the USB port that includes a connection part with recessed grooves respectively formed at opposite sides thereof, the apparatus comprising:
   a main body including first and second mounting portions;
   a port coupling part coupled with the second mounting portion of the main body, and inserted into and coupled with the USB port;
   a locking part movably provided in the port coupling part and being movable between a lock position where the locking part is coupled with the recessed grooves and a release position where the locking part is separated from the recessed grooves; and
   a locking and releasing part provided in the first mounting portion of the main body to be movable reciprocally such that the locking and releasing part is retractable from a front end of the main body, the locking and releasing part controlling locking and releasing motions of the locking part relative to the recessed grooves by interfering with the locking part when the locking and releasing part moves,
   wherein the locking and releasing part is partially withdrawn from the main body by using a release key in a state in which the locking and releasing part is inserted into the main body, thereby allowing a locking yoke to be released, the release key being coupled with a key hole formed in a front end of the locking and releasing part, and
   wherein the locking and releasing part includes:
   an outer frame coupled with the first mounting portion of the main body to be movable reciprocally;
   a locking member inserted into the outer frame, and including the key hole exposed forward and a pattern groove patterned on an inner surface of the key hole; and
   an interference bar extending from a rear end of the locking member and connected to the port coupling housing to be reciprocally slidable relative thereto, the interference bar interfering with the locking yoke in accordance with a movement position of the interference bar.

2. The apparatus of claim 1, wherein the USB port is a USB 3.1 port having the same patterned-connection terminals formed on opposite surfaces of the connection part, respectively.

3. The apparatus of claim 1, wherein the port coupling part includes:
   a tubular shaped port coupling housing configured such that an external shape thereof corresponds to an internal shape of the USB port, and opposite ends thereof are open; and
   a connection member coupled with a rear end of the main body in a state of being inserted into the port coupling housing,
   wherein the locking part is provided between the connection member and the port coupling housing to be movable between the lock position and the release position.

4. The apparatus of claim 3, wherein the connection member includes:
- a plate-shaped connection member body;
- a guide coupling portion provided at a first end of the connection member body and being in contact with an inner surface of the port coupling housing;
- first and second protruding coupling portions protruding from opposite sides of a second end of the connection member body, respectively, and coupled with the main body; and
- a guide portion protruding from an upper surface of the connection member body and guiding movement of the locking and releasing part.

5. The apparatus of claim 3, wherein the locking part includes:
- the locking yoke including a raised web having a plate structure, and a pair of raised arms extending from opposite ends of the raised web to face each other and each having at an end thereof a locking protrusion coupled with each of the recessed grooves,
- wherein the locking yoke moves reciprocally on the connection member relative to bent portions (P) of boundaries between the raised web and the raised arms in accordance with a movement position of the locking and releasing part, so that the locking protrusions are coupled with or separated from the recessed grooves.

6. The apparatus of claim 5, wherein the connection member is provided with a support protrusion preventing the raised arms of the locking yoke from being widened outward in a state in which the locking protrusions of the locking yoke are coupled with the recessed grooves of the connection part.

7. An apparatus of claim 1, wherein the main body includes:
- a housing including the first and second mounting portions; and
- a guide frame provided in the first mounting portion of the housing and coupled with the outer frame such that the outer frame is movable reciprocally, the guide frame being provided with an interference piece interfering with the locking and releasing part moved into the main body to prevent the locking and releasing part from being separated therefrom.

8. The apparatus of claim 7, wherein the outer frame includes:
- an elastic compressing piece protruding inside the outer frame, and moved by being interfered with by a latching bar of the release key inserted into the key hole to allow the interference piece to cooperate with the elastic compressing piece, such that the locking and releasing part by is released from a locked state; and
- an interference protrusion protruding outside the outer frame such that a moving distance of the interference protrusion is limited by a guide groove formed on an inner surface of the first mounting portion.

* * * * *